United States Patent

Lucas et al.

[15] 3,691,179
[45] Sept. 12, 1972

[54] CYCLOALKANO [C]PYRAZOLE-3-ACIDS

[72] Inventors: Robert Armistead Lucas, Mendham N.J. 07945; Herbert Morton Blatter, Summit, N.J. 07901

[73] Assignee: Ciba Corporation, Summit, N.J.

[22] Filed: July 31, 1970

[21] Appl. No.: 60,142

[52] U.S. Cl..........260/295.5 S, 260/141, 260/310 R, 260/311, 260/471 R, 260/518 R, 260/518 A, 260/519, 424/273
[51] Int. Cl. .............................................. C07d 49/18
[58] Field of Search ..................... 260/310 R, 295.5 S

[56] References Cited

OTHER PUBLICATIONS

Fusco et al., Gazz. Chim. Ital., Vol. 91, pages 1233–49 (1961). QD1.G28

Huisgen et al., Monatsh. Chemie, Vol. 98, pages 1618–26 (1967). QD1.M73

*Primary Examiner*—Natalie Trousof
*Attorney*—Harry Goldsmith, Joseph G. Kolodny and Mario A. Monaco

[57] ABSTRACT

Cycloalkano[c]pyrazole-3-acids, e.g. those of the formula

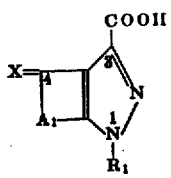

$R^1$ = free or functionally converted hydroxy- or aminophenyl
$A^1$ = alkylene
$X$ = HOH or O and functional derivatives thereof, exhibit antiviral effects.

2 Claims, No Drawings

CYCLOALKANO[C]PYRAZOLE-3-ACIDS

SUMMARY OF THE INVENTION

The present invention concerns and has for its object the provision of new cycloalkano[c]pyrazole-3-carboxylic acids, more particular those of the Formula I

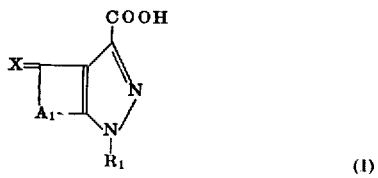

in which $R_1$ is free or functionally converted hydroxy- or amino-phenyl, $A_1$ is lower alkylene separating the adjacent carbon atoms by two to four carbon atoms, and X is hydrogen and hydroxy, or oxo, of therapeutically acceptable functional acid or amino derivatives thereof, and methods for the preparation of said compounds; as well as corresponding pharmaceutical compositions; their preparation and use. The compounds of the invention possess antiviral activity and are useful for this purpose.

DESCRIPTION OF THE PREFERRED EMBODIMENTS

In Formula I, the free or functionally converted hydroxyphenyl or aminophenyl radical $R_1$ is preferably a phenyl radical substituted by at least one substituent, selected for example from a free, etherified or esterified hydroxy group, such as lower alkoxy, e.g. methoxy, ethoxy, n- or i-propoxy or -butoxy, halo, e.g. fluoro, chloro or bromo, or primary, secondary or tertiary amino, such as amino, lower alkylamino, e.g. methyl-, ethyl- or propylamino, di-lower alkylamino, e.g. dimethylamino or diethyl-amino, or acylamino, such as lower alkanoylamino, e.g. formylamino, acetylamino or proprionylamino. Preferred substituted phenyl radicals are (hydroxy)-phenyl, (lower alkoxy)-phenyl, (halo)-phenyl, (amino)-phenyl, (lower alkylamino)-phenyl, (di-lower alkylamino)-phenyl or (lower alkanoylamino)-phenyl. The term "lower" referred to above and hereinafter in connection with organic radicals or compounds respectively, defines such with up to seven, preferably up to four carbon atoms.

The lower alkylene radical $A_1$ preferably is 1,2-ethylene 1,2- or 1,3-propylene or 2-methyl-1,2-propylene, but also, for example, 1,2-, 1,3- or 1,4-butylene, -pentylene, -hexylene or -heptylene.

Therapeutically acceptable functional derivatives of the acids of Formula I are preferably their esters, for example, their lower alkyl esters, such as methyl, ethyl, n- or i-propyl, -butyl, -pentyl, -hexyl or -heptyl, their unsubstituted or substituted amides, e.g. mono- or di- lower alkylamides, ammonium or metal salts. Amino derivatives are the lower alkyl- or phenyl-lower alkyl quaternaries and acid addition salts.

The compounds of the invention exhibit valuable pharmacological properties. They exhibit primarily antiviral activity, particularly against influenza strains, as can be demonstrated in animal tests, using advantageously mammals, e.g. mice, as test objects. Such tests can be performed, e.g. by administering the compounds of the invention in the form of aqueous solutions or suspensions subcutaneously to mice twice daily for the first three days and singly for the next 10 days in doses between about 100 and 250/mg/kg or preferably at 200 mg/kg, beginning two hours prior to infection with 125 $ID_{50}$ of strain $A_2/JAP_{305}$ or strain $A/PR_8$. Quantitative measurement of virus inhibition can be assessed by an indirect serologic method whereby the geometric mean of the resultant antibody titers of the treated and control animals are determined. In addition to the serologic response assay, virus isolation studies can be completed in which virus titers in the lungs and blood of treated and control animals are compared at various time intervals after infection. Thus, for example, subcutaneous treatment with 1-p-fluorophenyl-4-oxo-6,6-dimethyl-4,5,6,7-tetrahydroin-dazole-3-carboxylic acid, a characteristic compound of the invention, in doses of 200 mg/kg as described above, of mice infected with influenza virus $A_2/JAP_{305}$ results in a marked reduction of virus content in blood and lungs and, in turn, a decreased production of antiviral antibodies. Accordingly, the compounds of the invention are useful as parenteral antiviral agents. Besides their above-mentioned utility, the compounds of this invention are also useful intermediates in the manufacture of other valuable pharmacologically active products.

Particularly useful are compounds of Formula I in which $R_1$ is (hydroxy)-phenyl, (lower alkoxy)-phenyl, (halo)-phenyl, (amino) phenyl, (lower alkylamino)-phenyl, (di-lower alkylamino)-phenyl or (lower alkanoylamino)-phenyl, $A_1$ is lower alkylene separating the adjacent carbon atoms by two to four carbon atoms, and X is hydrogen and hydroxy or oxo, or a lower alkyl ester, the amide, a mono- or di- lower alkylamide, a lower alkyl quaternary, phenyl-lower alkyl quaternary or a therapeutically useful ammonium, metal or acid addition salt thereof.

Preferred are compounds of Formula I, in which $R_1$ is (hydroxy)-phenyl, (lower alkoxy)-phenyl, (halo)-phenyl or (amino)-phenyl, $A_1$ is lower alkylene separating the adjacent carbon atoms by three carbon atoms, and X is hydrogen and hydroxy, or oxo, the lower alkyl esters, or the therapeutically useful alkali mental or acid addition salts thereof.

More preferred are the compounds of Formula II

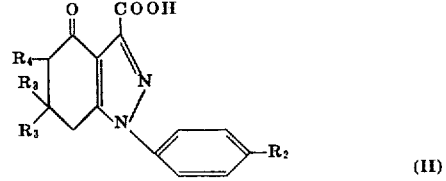

in which $R_2$ is hydroxy, methoxy, fluoro, chloro, bromo or amino, and each of $R_3$ and $R_4$ is hydrogen or methyl, or their methyl or ethyl esters, or the therapeutically useful sodium, potassium or acid addition salts thereof.

Especially valuable is the compound of Formula II, and being the 1p-fluorophenyl-4-oxo-6,6-dimethyl-4,5,6,7-tetrahydroindazole-3-carboxylic acid, its ethyl ester, or a therapeutically useful sodium or acid addition salt thereof.

The compounds of the invention are prepared according to methods known per se. For example, they are obtained by:

a. ring-closing a lower alkyl ester of a compound of the Formula III

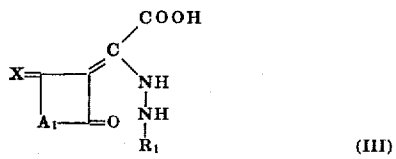

(III)

or, b. converting in a compound of the Formula IV or a functional derivative thereof

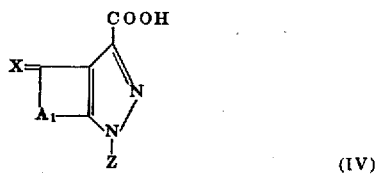

(IV)

wherein Z is a radical convertible into $R_1$, Z into said free or functionally converted hydroxy- or aminophenyl radical and, if desired, converting any resulting compound into another compound of the invention. In the formulas III and IV, X, $A_1$ and $R_1$ have the meanings given above under Formula I.

According to process (a), the ring closure is preferably carried out in the presence of acids. Such acids are for example, mineral acids, such as sulfuric or phosphoric, Lewis acids, such as aluminum chloride, stannous chloride or polyphosphoric acid, or especially organic sulfonic acids, such as methyl-, ethyl-, p-promobenzene-, or above all p-toluenesulfonic acid.

According to process (b), the substituent Z in Formula IV, a radical convertible into $R_1$, is for example a nitrophenyl radical which is reduced, for example, with catalytically activated or, more preferably, nascent hydrogen. Catalysts of preference are for example palladium or platinum. Nascent hydrogen is especially generated from the reaction of a metal, such as a heavy metal, for example, zinc dust in the presence of an alcoholic solvent, such as a lower alkanol, e.g. methanol, ethanol or 2-propanol, and a metallic halide, such as an alkaline earth metal halide, e.g. calcium chloride. The nitro substituent is also replaceable by fluoro by reacting with an alkali metal fluoride, such as sodium, cesium, rubidium or preferably potassium fluoride, in the presence of an aprotic solvent, e.g. dimethyl sulfoxide or dimethyl sulfone at elevated temperatures.

The compounds of the invention so obtained can be converted into each other according to known methods. For example, resulting free acids may be esterified with the corresponding alcohols in the presence of a strong acid, e.g. hydrochloric, sulfuric, benzene or p-toluene solfonic acid, or converted into their halides by treatment with thionyl halides or phosphorus halides or oxyhalides, which in turn may be treated with alcohols, ammonia or amines in order to obtain the corresponding esters or amides respectively. Resulting esters may be hydrolyzed or transesterfied in the presence of acidic or alkaline agents, e.g. mineral or complex heavy metal acids or alkali metal carbonates or alcoholates, or treated with ammonia corresponding amines. Resulting amides can be hydrolyzed under acidic or alkaline conditions, e.g. with the use of aqueous mineral and/or carboxylic acids or alkali metal hydroxides, also alcoholyzed or transaminated, e.g. with the use of mercuric oxide or alkyl halides followed by hydrolysis. For example, resulting compounds in which X is oxo can be reduced to compounds in which X is hydrogen and hydroxy according to conventional methods, e.g. with complex light metal hydrides, e.g. sodium borohydride. Resulting compounds, in which X is oxo and containing in $\alpha$-position at least one hydrogen atom, can be metallized therein, e.g. with the use of alkali metals or their derivatives, such as phenyl lithium, triphenylmethylsodium or sodium hydride, amides or alcoholates, and thereupon reacted with reactive esters of lower alkanols. Resulting esters, in which X is oxo and containing in $\alpha$-position two hydrogen atoms, can be formylated with ethyl formate in the presence of sodium hydride, then the resulting hydroxymethylidene compound esterified with benzoic anhydride and thereupon the ester reductively cleaved to the corresponding methylated compound with catalytically activated hydrogen, using catalysts such as platinum oxide. Resulting compounds, in which $R_1$ is aminophenyl or mono-lower alkylaminophenyl, can be reacted with a reactive ester of a corresponding alcohol, e.g. a lower alkanol, or their resulting esters can be acylated, for example, with a reactive functional derivative of a corresponding acid, such as a halide or anhydride thereof, or resulting acyl derivatives can be hydrolyzed, for example, with the use of acidic or alkaline hydrolyzing agents. Resulting compounds, in which $R_1$ is tertiary aminophenyl, can be quaternized in the usual manner, for example, with the use of reactive esters of lower alkanols or phenyl-lower alkanols. Resulting compounds, in which $R_1$ is free aminophenyl can be diazotized with sodium nitrite in the presence of a mineral acid, for example, a hydrohalic acid, such as hydrochloric acid, or sulfuric acid. The resulting diazonium salt can be treated with a cuprous halide, e.g. chloride or bromide, according to the Sandmeyer reaction to give the corresponding chloro or bromophenyl compounds. Resulting compounds, in which $R_1$ is lower alkoxyphenyl, can be cleaved to the corresponding free hydroxyphenyl compounds in the usual manner, for example with the use of Lewis acids, such as aluminum chloride. In turn, resulting free hydroxyphenyl compounds can be alkylated with lower alkyl sulfates, such as dimethyl sulfate, under basic conditions.

A resulting acid can be converted into its salts according to conventional methods, for example, by reacting it with about a stoichiometric amount of a suitable salt-forming reagent, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid, until the proper pH has been reached. A resulting basic compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxy-ethanesulfonic, ethylene-sulfonic, benzenesulfonic, halobenzenesulfonic, toluenesulfonic, naphthalenesulfonic, sulfanilic or cyclohexylsulfamic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a compound is referred to in this context, a corresponding salt is also intended, provided such is possible or appropriate under the circumstances.

The above reactions are carried out according to standard methods, in the presence or absence of diluents, preferably such as are inert to the reagents and are solvents thereof, of catalysts condensing agents and/or inert atmospheres, at lower temperatures, room temperature or advantageously elevated temperatures, at atmospheric or superatmospheric pressure.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, a more preferred method of obtaining a lower alkyl ester of a compound of the Formula I by process (a) comprises reacting the corresponding lower alkyl-(2-hydroxy-5(6 or 7)-oxo-1-cycloalkenyl)-glyoxolate with the corresponding $R_1$-hydrazine hydrochloride, wherein the lower alkyl ester of a compound of the Formula III is formed intermediarily. Mainly, those starting materials should be used in the process of the invention that lead to the formation of those compounds indicated above as being specially valuable.

The starting materials used are known, or if new, can be prepared according to known methods. For example, in process (a) when X is oxo, compounds of the Formula III are obtained as intermediates according to the method described above. The lower alkyl (2-hydroxy-5(6 or 7)-oxo-1-cycloalkenyl)-glyoxolates, mentioned above, are prepared by reacting cycloalkane-1,3-diones with lower alkyl- haloglyoxolates in the presence of sodium hydride. Compounds of the Formula IV in process (b) are obtained by ring closure according to the method described above in process a).

The pharmacologically active compounds of the invention are useful in the manufacture of pharmaceutical compositions comprising an effective amount thereof in conjunction or admixture with excipients suitable for parenteral application. Preferred are injectable compositions, for example aqueous isotonic solutions or suspensions. They may be sterilized and/or contain adjuvants, such as preserving, stabilizing, wetting or emulsifying agents, solution promoters, salts for regulating the osmotic pressure and/or buffers. Said pharmaceutical compositions may also contain other therapeutically valuable substances. They are prepared according to conventional mixing methods and contain about 0.1 to 75 percent, preferably about 1 to 50 percent, of the active ingredient.

The following examples are intended to illustrate the invention and are not to be construed as being limitations thereon. Temperatures are given in degrees Centigrade, and all parts wherever given are parts by weight.

EXAMPLE 1

The mixture of 10 g ethyl(2-hydroxy-4,4-dimethyl-6-oxo-1-cyclohexenyl)-glyoxolate, 6.15 ml triethylamine, 6.75 g p-fluorophenylhydrazine hydrochloride and 100 ml anhydrous ethanol is refluxed for three hours, cooled and diluted with 300 ml water. The crystals formed are collected on a filter, washed with water and dried yielding the ethyl 1-p-fluorophenyl-4-oxo-6,6-dimethyl-4,5,6,7-tetrahydroindazole-3-carboxylate of the formula

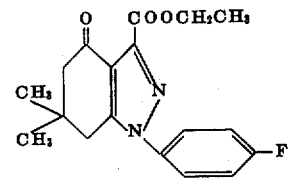

melting at 147°–149°.

The starting material is prepared as follows:
To 14 g 5,5-dimethyl-1,3-cyclohexandione in 240 ml tetrahydrofuran is added portionwise at 50° 4.22 g 57 percent sodium hydride dispersed in mineral oil. The mixture is refluxed for one-half hour, cooled to 5° and 10.76 ml ethyl chloroglyoxolate in 20 ml tetrahydrofuran is added dropwise. Following the addition, the reaction mixture is allowed to come to room temperature, whereupon it is diluted with 240 ml water and the organic layer separated. The aqueous layer is extracted thrice with methylene chloride. The combined organic layers are evaporated. The residue is redissolved in 75 ml methylene chloride, washed with water, dried, filtered and evaporated. The residual semi-solid is treated with 50 ml diethyl ether and the unreacted 5,5-dimethyl-1,3-cyclohexandione, which is crystalline, is filtered off. The filtrate in 280 ml diethyl ether is added to the solution of 19.96 g cupric acetate in 280 ml water and the mixture stirred for 1½ hours. The complex formed is filtered, washed with diethyl ether, water and again with diethyl ether and dried. The complex is then treated with 146 ml 6N hydrochloric acid and 100 ml diethyl ether for 20 minutes, and the layers separated. The aqueous layer is extracted with diethyl ether, and the combined extracts are washed with water, dried, filtered and evaporated. There is obtained crystalline ethyl (2-hydroxy-4,4-dimethyl-6-oxo-1-cyclohexenyl)-glyoxolate, m.p. 62°–65°.

EXAMPLE 2

To the solution of 1.1 g potassium hydroxide, 2.5 ml water and 25 ml 95 percent aqueous ethanol is added 5.0 g ethyl 1-p-fluorophenyl-4-oxo-6,6-dimethyl-4,5,6,7-tetrahydroindazole-3-carboxylate. The mixture is refluxed for one hour, diluted with 75 ml water and acidified with 6N hydrochloric acid. The solids formed are filtered, washed with water, triturated with 20 ml diethyl ether, collected on a filter and dried to afford the 1-p-flurophenyl-4-oxo-6,6-dimethyl-4,5,6,7-tetrahydroindazole-3-carboxylic acid of the formula

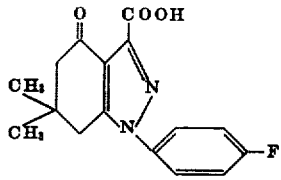

melting at 237°–238°.

EXAMPLE 3

The mixture of 29 g ethyl (2-hydroxy-6-oxo-1-cyclohexenyl)-glyoxolate, 19 ml triethylamine, 22 g p-fluorophenylhydrazine hydrochloride and 290 ml anhydrous ethanol is refluxed for three hours, cooled and diluted with 600 ml water. The crystals formed are collected on a filter, washed with water and dried to give the ethyl 1-p-fluorophenyl-4-oxo-4,5,6,7-tetrahydroindazole-3-carboxylate of the formula

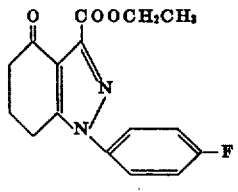

melting at 110°–112°.

EXAMPLE 4

Preparation of 5 ml ampoules each containing 100 mg of the active ingredient.

| Material | Amount | |
|---|---|---|
| 1-p-Fluorophenyl-4-oxo-6,6-dimethyl-4,5,6,7-tetrahydroindazole-3-carboxylic acid | 0.340 | kg |
| Chlorobutanol | 0.085 | kg |
| Methylcellulose—100 cps. | 0.1785 | kg |
| Polysorbate 80 | 0.085 | kg |
| Sodium chloride CP | 0.136 | kg |
| Sodium carboxymethylcellulose 70 MW | 0.051 | kg |
| Water for injection, q.s. | 17.000 | lt |

Procedure

The 1-p-fluorophenyl-4-oxo-6,6-dimethyl-4,5,6,7-tetrahydroindazole-3-carboxylic acid and chlorobutanol are dissolved in 13,000 lt of water for injection at 90°. Sodium carboxymethylcellulose is added and the mixture agitated with a mechanically driven stirring rod. Methylcellulose is then added and the mixture agitated for 15 minutes to disperse it. The mixture is refrigerated at 10° for 12 hours, mixed well and polysorbate 80 added. A solution of the sodium chloride in 250 ml water for injection is added and the mixture diluted to a volume of 17,000 lt with water for injection. The mixture is filtered through a sintered glass filter, coarse porosity and the filtrate placed into 2 lt sterilizer bottles and steam sterilized at 100° for three hours and 15 minutes. The sterilized suspension is then filtered into 5 ml sterilized ampoules.

We claim:

1. A cycloalkano pyrazole-3-carboxylic acid having the formula

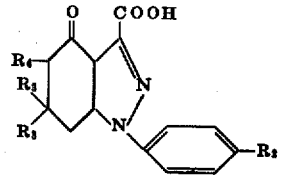

in which $R_2$ is fluoro, chloro or bromo and each of $R_3$ and $R_4$ is hydrogen or methyl, or the methyl or ethyl ester, or the therapeutically useful sodium, potassium or acid addition salt thereof.

2. A compound as claimed in claim 1, and being the 1-p-fluorophenyl-4-oxo-6,6-dimethyl-4,5,6,7-tetrahydroindazole-3-carboxylic acid, or its ethyl ester or a therapeutically useful sodium or acid addition salt thereof.

* * * * *

PO-1050
(5/69)

UNITED STATES PATENT OFFICE
CERTIFICATE OF CORRECTION

Patent No. 3,691,179    Dated September 12, 1972

Inventor(s) ROBERT ARMISTEAD LUCAS ET AL

It is certified that error appears in the above-identified patent and that said Letters Patent are hereby corrected as shown below:

Cover page, after "[73] Assignee:" delete "Ciba Corporation, Summit, New Jersey" and insert --- CIBA-GEIGY Corporation, Ardsley, New York ---.

Signed and sealed this 2nd day of July 1974.

(SEAL)
Attest:

EDWARD M. FLETCHER, JR.
Attesting Officer

C. MARSHALL DANN
Commissioner of Patents